(No Model.)

H. B. WILEY.
KITCHEN UTENSIL.

No. 485,312.  Patented Nov. 1, 1892.

Witnesses
A. A. Eicks
[signature]

Horace B. Wiley, Inventor
By his Attorneys Higdon & Higdon

UNITED STATES PATENT OFFICE.

HORACE B. WILEY, OF ST. LOUIS, MISSOURI, ASSIGNOR OF TWO-THIRDS TO THOMAS W. WILEY AND JOHN J. NEWPORT, OF SAME PLACE.

KITCHEN UTENSIL.

SPECIFICATION forming part of Letters Patent No. 485,312, dated November 1, 1892.

Application filed December 14, 1891. Serial No. 415,045. (No model.)

*To all whom it may concern:*

Be it known that I, HORACE B. WILEY, of the city of St. Louis and State of Missouri, have invented certain new and useful Improvements in Kitchen Utensils, of which the following is a full, clear, and exact description, reference being had to the accompanying drawings, forming a part hereof.

My invention relates to improvements in kitchen utensils; and it consists in the novel arrangement and combination of parts, as will be more fully hereinafter described, and designated in the claim.

Figure 1:
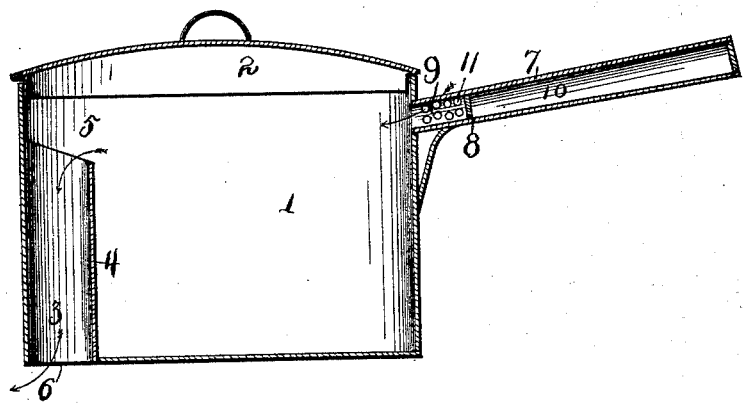
Figure 2:
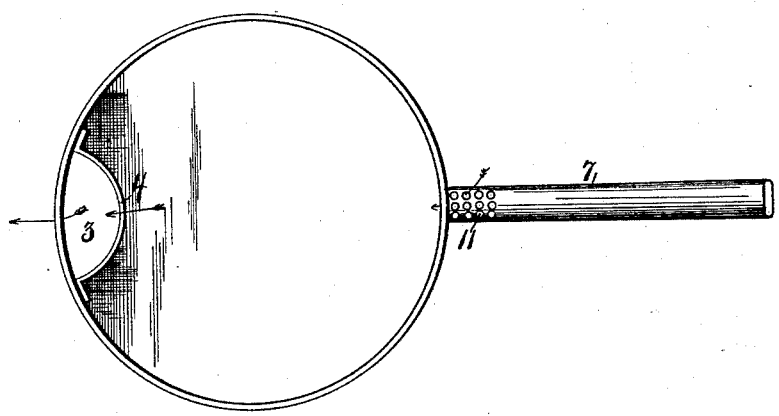

In the drawings, Figure 1 is a vertical section of my complete invention. Fig. 2 is a top plan view with the lid removed.

The object of my invention is to provide a simple and improved vessel for cooking or other similar purposes, so constructed that all volatile products in the way of disagreeable odors, steam, &c., may be carried from the said vessel through the stove and out through the draft of the same.

I will give a further description of the use and object of my invention in connection with a mechanical description of the same.

Referring to the drawings, 1 indicates an ordinary cooking-receptacle provided with an appropriate fitting lid 2. The bottom of said receptacle 1 is provided with a substantially-elliptical-shaped hole 3, which when receptacle 1 is placed in the ordinary place of the stove-cap affords a communication between the fire-chamber of said stove and the interior space of said receptacle. Secured around the inner edge of said hole 3, and also to the interior lateral surface of the receptacle 1, is a substantially-U-shaped cleat 4, the object of which is to prevent the substance contained in receptacle 1 from passing out through the hole 3. It can be readily perceived by referring to Fig. 1 that the U-shaped cleat 4 is of such a construction and occupies such a position relative to the lid 2 of the receptacle that a passage 5 is formed between the upper edge of said cleat and the lid 2, thus permitting the volatile products to pass between said lid and cleat and down between said cleat and the side of the receptacle, as illustrated by arrows. In order to effect a draft through the interior space of said receptacle 1, it is necessary to provide said receptacle with air-ingress ports or holes, which should lie or be formed in said receptacle oppositely to the passage 5.

It may be stated in this connection for elucidation that when the cleat 4 is secured to the interior surface of the side of the receptacle 1, as hereinbefore stated, a passage 6 is formed, through which the volatile products generated in the receptacle pass, and find an exit through the draft of the stove.

I will now proceed to describe the manner I employ for admitting cold air into the interior space of the receptacle 1 for the purpose of creating a draft thereto and forcing the volatile products out through the passage 6.

7 indicates a hollow handle, which is secured to the receptacle 1 in any suitable and mechanical manner. Said handle 7 has a solid partition 8 secured therein at a distance of about one inch from said receptacle, thus forming in said handle a compartment 9, which is in communication with the interior space of the said receptacle, and a compartment 10, which is of no special function.

11 indicates a series of air-ingress ports, which are formed in the handle 7 between partition 8 and the receptacle, through which the cold air passes into compartment 9, and thence into the interior space of the receptacle 1, as indicated by arrows.

Having given a description of the mechanical parts of my invention, I will now proceed to describe the operation of the same, it being conceived in this connection that the cooking-receptacle 1 occupies the position usually occupied by a stove-cap.

Whenever any volatile products are generated, the cold air passing in through the ports 11, which lie oppositely to the passages 5 and 6, will force the rarified volatile products, in accordance with the principles of pneumatics, through the passage 5, thence down through the passage 6, and be carried off by the draft of the stove.

Having fully described my invention, what I claim is—

As an improved article of manufacture, a culinary utensil consisting of a receptacle 1, having the contour of its sides unbroken, a U-shaped cleat 4, secured to one side of said receptacle within the interior thereof and forming a passage 5, terminating below the upper end of the receptacle, the bottom of the receptacle having an opening 6 communicating with said passage, a hollow handle 7, secured to the receptacle diametrically opposite to the passage and provided with a partition 8, and apertures 9 between said partition and the receptacle, said apertures affording communication between the passage 5 and the exterior atmosphere, substantially as and for the purpose set forth.

In testimony whereof I hereunto affix my signature in presence of two witnesses.

HORACE B. WILEY.

Witnesses:
ED. E. LONGAN,
ALFRED A. EICKS.